UNITED STATES PATENT OFFICE.

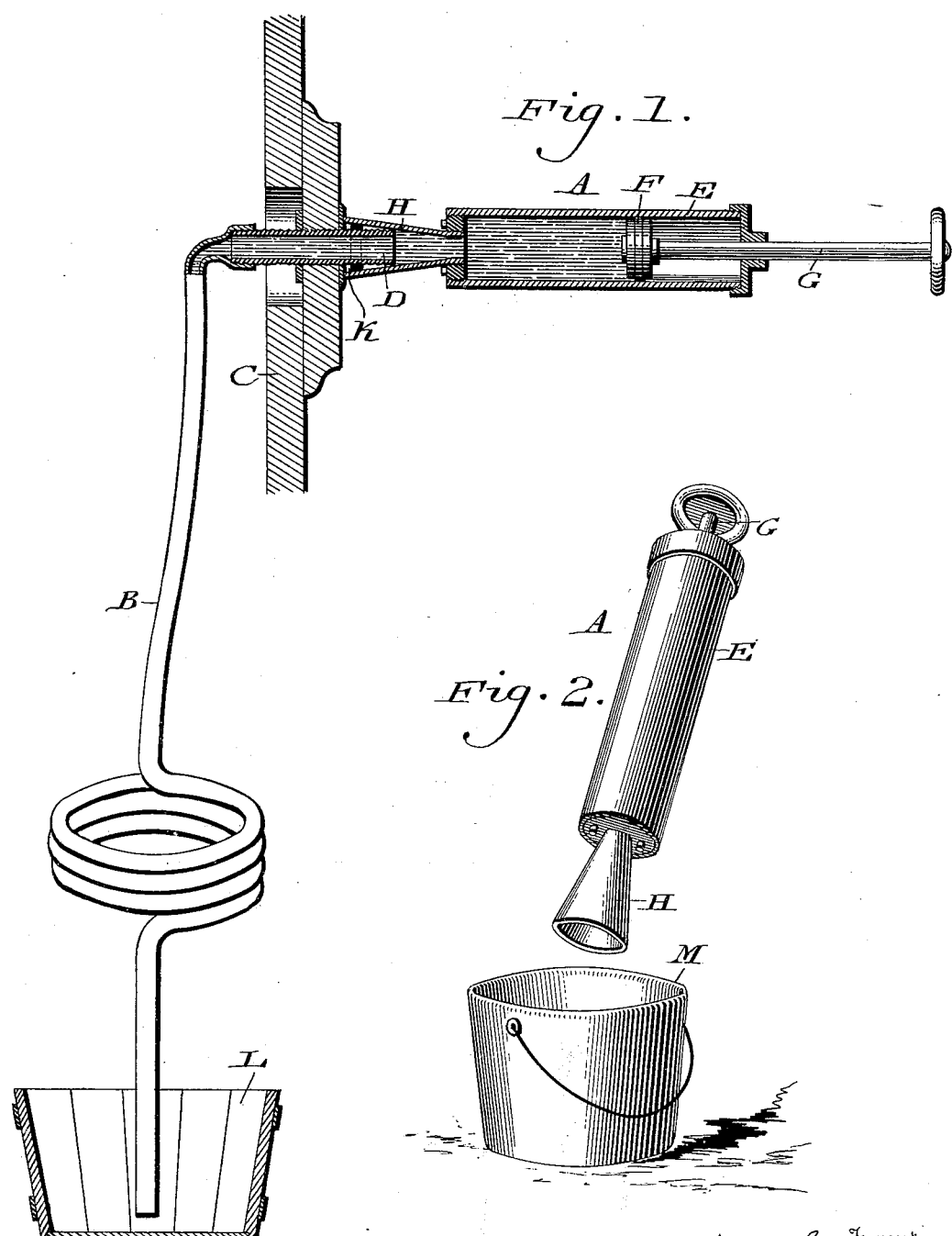

JOHN HASSON, OF PHILADELPHIA, PENNSYLVANIA, ASSIGNOR OF ONE-HALF TO JAMES F. HEVRON, OF SAME PLACE.

BEER OR OTHER PIPE CLEANER.

SPECIFICATION forming part of Letters Patent No. 635,961, dated October 31, 1899.

Application filed May 29, 1899. Serial No. 718,663. (No model.)

*To all whom it may concern:*

Be it known that I, JOHN HASSON, a citizen of the United States, residing in the city and county of Philadelphia, State of Pennsylvania, have invented a new and useful Improvement in Beer or other Pipe Cleaners, which improvement is fully set forth in the following specification and accompanying drawings.

This invention relates to a novel construction of an apparatus that is designed especially for cleaning pipes through which beer, ale, and the like are conducted to the faucet where it is dispensed; and it consists of a pump and means for forming a tight joint with the end of a pipe, whereby a cleansing liquid may be forced therethrough.

The invention further consists of the features of construction hereinafter fully described and specifically claimed.

Figure 1 represents a view in side elevation and in vertical section of a beer-pipe and my cleaning apparatus applied thereto. Fig. 2 represents a perspective view of the apparatus.

Similar letters of reference indicate corresponding parts in the figures.

Referring to the drawings, A designates the improved pipe-cleaning apparatus, and B a pipe leading upwardly, for instance, to the wall C of a bar, through which it passes and terminates with a stub D, to which the faucet (not shown) is attached, said stub being surrounded by a plate and a washer or gasket, said plate being adapted to receive the thrust of the nozzle of the pump of the apparatus A, while said nozzle engages with said gasket, as at K, as will be hereinafter more fully described and as is most plainly shown in Fig. 1, said apparatus consisting of the cylinder E, which is provided with the piston F and piston-rod G, projecting through the rear head thereof. The other head of the cylinder is provided with a nozzle H of novel construction. The said nozzle H flares outwardly from the end of the cylinder or is bell-shaped and joins the head of the cylinder at its small end. The said nozzle H fits over the stub D, as shown in Fig. 1, and a tight joint is made between said nozzle and stub by said gasket or washer K. The stub D is threaded exteriorly, as usual, and the gasket or washer K engages the threads and is held against longitudinal movement thereon, the location of the same upon the stub being regulated with reference to the nozzle H, so that when the latter is applied, as shown, its inner face impinges upon the gasket or washer and by reason of its flare or bell shape forms a hermetic joint. The end of the nozzle H may rest against the wall C, as shown, it being understood that the same is forcibly held in contact with the gasket or washer to form the joint referred to.

The operation is as follows: In the particular instance illustrated the faucet is removed from the stub D and the lower end of the pipe B disconnected from the keg or barrel when the pipe is to be cleaned. A suitable pail L being placed below the lower end of the pipe B, the cylinder E is filled with the cleansing fluid—for instance, from a pail M—in an obvious manner. After the gasket or washer is correctly located upon the stub D the nozzle H is applied thereto to form the joint referred to. The fluid is then ejected into the pipe B and, flowing through the same, is received by pail L. By reciprocating said piston the fluid can be passed back and forth through the pipe, if desired, or the fluid can be placed in the pail L in the first instance and elevated to fill the pipe and drawn back and forth, the result being the same in either case.

The nozzle H requires to be made strong and durable owing to the severe usage to which it is subjected in applying it over and holding it upon the stub D and is made separate from the cylinder or barrel E of the pump, and in order to provide a firm connection for said nozzle with said barrel I employ the plug J, which is screwed into the forward end of the barrel and has the narrow end of said nozzle screwed into the same, it being also noticed that said narrow end of the nozzle is next to the barrel, so that the fluid will be forcibly ejected from the latter and so driven into the stub before the fluid loses much of its force by expansion in the nozzle due to the widening of the latter from its inner to its outer end.

Having thus described my invention, what I claim as new, and desire to secure by Letters Patent, is—

In a pipe-cleaner, the combination of a stub secured to the pipe, a plate and a gasket fitting on said stub, and a pump having a nozzle interiorly of conical form receiving said stub, the narrow end of said nozzle being connected with the discharge end of the pump and the location of said gasket upon the stub being so related to the diameter and angularity of said nozzle that the end of the latter rests against said plate and the gasket is compressed laterally between the stub and nozzle when the pump is forcibly applied.

JOHN HASSON.

Witnesses:
JOHN A. WIEDERSHEIM,
WM. C. WIEDERSHEIM.